(12) United States Patent
Wefers et al.

(10) Patent No.: US 7,599,848 B2
(45) Date of Patent: Oct. 6, 2009

(54) SYSTEM AND METHODS AND RISK EVALUATION USING AN OBJECT MEASURE-VALUE IN STRATEGIC PLANNING

(75) Inventors: Marcus Wefers, Heidelberg (DE); Thomas Fleckenstein, Frankenthal (DE)

(73) Assignee: SAP AG, Walldorf (DE)

(*) Notice: Subject to any disclaimer, the term of this patent is extended or adjusted under 35 U.S.C. 154(b) by 1153 days.

(21) Appl. No.: 10/365,954

(22) Filed: Feb. 12, 2003

(65) Prior Publication Data
US 2003/0182337 A1 Sep. 25, 2003

Related U.S. Application Data

(60) Provisional application No. 60/355,833, filed on Feb. 13, 2002.

(51) Int. Cl.
*G06F 9/44* (2006.01)
(52) U.S. Cl. .......................................... 705/7
(58) Field of Classification Search .................. 705/7
See application file for complete search history.

(56) References Cited

U.S. PATENT DOCUMENTS

| | | | |
|---|---|---|---|
| 5,406,477 A | | 4/1995 | Harhen |
| 6,219,805 B1 * | | 4/2001 | Jones et al. .................. 714/38 |
| 6,233,143 B1 * | | 5/2001 | Gamble et al. .............. 361/685 |
| 6,564,190 B1 * | | 5/2003 | Dubner ..................... 705/36 R |
| 6,876,992 B1 * | | 4/2005 | Sullivan ....................... 706/47 |
| 6,895,383 B2 * | | 5/2005 | Heinrich ........................ 705/7 |
| 7,006,992 B1 * | | 2/2006 | Packwood .................... 705/38 |
| 7,035,809 B2 * | | 4/2006 | Miller et al. ................... 705/8 |
| 7,113,914 B1 * | | 9/2006 | Spielmann et al. ............. 705/7 |
| 7,130,779 B2 * | | 10/2006 | Beverina et al. ............... 703/6 |
| 7,359,865 B1 * | | 4/2008 | Connor et al. ................ 705/10 |
| 7,359,866 B2 | | 4/2008 | Connor et al. |
| 2002/0138318 A1 * | | 9/2002 | Ellis et al. ...................... 705/7 |
| 2002/0194040 A1 * | | 12/2002 | Kornfein et al. ............... 705/7 |
| 2002/0198750 A1 * | | 12/2002 | Innes et al. .................... 705/7 |
| 2003/0023470 A1 * | | 1/2003 | Labbi ........................... 705/7 |
| 2003/0023526 A1 | | 1/2003 | Stewart |
| 2003/0046128 A1 | | 3/2003 | Heinrich |
| 2003/0135401 A1 * | | 7/2003 | Parr ............................. 705/8 |
| 2003/0154150 A1 | | 8/2003 | Wefers et al. |
| 2004/0015375 A1 * | | 1/2004 | Cogliandro .................... 705/7 |
| 2004/0068429 A1 * | | 4/2004 | MacDonald ................. 705/10 |

(Continued)

OTHER PUBLICATIONS

Norton, David et al., SAP Strategic Enterprise Management: Translating Strategy Into Action: The Balanced Scorecard SAP AG, May 1999.*

(Continued)

*Primary Examiner*—Scott L Jarrett
(74) *Attorney, Agent, or Firm*—Finnegan, Henderson, Farabow, Garrett & Dunner LLP

(57) ABSTRACT

A method, system and computer product for risk evaluation. A computer assigns a risk to an object. The object has an object measure-value and the risk has at least one threat level. The computer receives a probability of the at least one threat level. The probability refers to the object. The computer calculates the object measure-value by using the probability of the at least one threat level and by using a deviation-value that corresponds to the at least one threat level and relates to the object.

19 Claims, 8 Drawing Sheets

U.S. PATENT DOCUMENTS

| | | | |
|---|---|---|---|
| 2004/0068431 A1* | 4/2004 | Smith et al. | 705/10 |
| 2004/0215551 A1* | 10/2004 | Eder | 705/38 |
| 2005/0086090 A1* | 4/2005 | Abrahams et al. | 705/7 |
| 2008/0027841 A1* | 1/2008 | Eder | 705/35 |

OTHER PUBLICATIONS

SAP Strategic Enterprise Management: Enabling Value Based Management SAP AG, 1999.*

SAP AG Strengthens SAP Strategic Enterprise Management Solution By Adopting Proven Approach for Strategic Management Processes From The Balanced Scorecard Collaborative, Business Wire, Apr. 20, 1999.*

Wefers, Marcus, Strategy Company Management with Balanced Scorecard SAP AG, 1999, German.*

Cummings, Nigel, @Risk delivers richer picture OR Topics, Feb. 1999.*

Wefers, Marcus, Strategic Enterprise Management with SAP Balanced Scorecard SAP Insider, vol. 2, No. 1, Jan.-Mar. 2001.*

Dewor, Eva et al., The Role of KonTrag in Enterprise Management Feb. 2002, English & German versions.*

MySAP Financials: Strategic Enterprise Managemet With The Balanced Scorecard SAP, 2002.*

Palisade.com Web Pages—@Risk May-Jun. 2000, Retrieved from Archive.org Apr. 7, 2006.*

Haimes, Yacov, Risk Modeling, Assessment and Management John Wiley & Sons, Inc., 1998, ISBN: 0471240052.*

CorVu and IBS Provide Business Peformance Management Solutions for SAP Business Wire, Oct. 31, 2000.*

Will, Melissa, Rating reasonable risks Women in Business, vol. 53, No. 4, Jul./Aug. 2001.*

CorVu Introduces Enterprise Risk Management for the 21st Century PR Newswire, Nov. 28, 2001.*

Meullbroek, Lisa, The promise and challenge of integrated risk management Risk Management and Insurance Review, vol. 5, No. 1, Spring 2002.*

Ergometrics.com Web Pages Mar. 2001, Retrieved from Archive.org Jan. 25, 2007.*

Epstein, Marc et al., Implementing Corporate Strategy: From Tableaux de Bord to Balanced Scorecards European Management Journal, vol. 16, No. 2, 1998.*

Smith, Heather et al., Risk Management in Information SYstems: Problems and Potential Communications of AIS, vol. 7, No. 13, Aug. 2001.*

Martinsons, Maris et al., The balanced scorecard: a foundation for the strategic management of information systems Decision Support Systems, vol. 25, 1999.*

SAP Announces Strategic Enterprise Management Executive Applications Business Wire, Jun. 22, 1998.*

Locatelli, Mary et al., Achieving business benefits through reporting on internal controls Bank Accounting & Finance; Summer 1999; vol. 12, No. 4.*

Egerdahl, Ryan L, A Risk Matrix Approach to Data Processing Facility Audits The Internal Auditor; Jun. 1995; vol. 52, No. 3.*

Daly, James, The 30-minute risk analysis Computerworld; Nov. 29, 1993; vol. 27, No. 48.*

Dewor, Eva and Wefers, Marcus, "The Role of KonTraG in Enterprise Management", English language translation of "Wie das KonTraG einen Beitrag zur Unternehmenssteuerung leisten kann", Versicherungswirtschaft, Verlag Versicherungswirtschaft GmbH, Karlsruhe, Germany, 8 pages (Apr. 2002).

Dewor, Eva and Wefers, Marcus, "Wie das KonTraG einen Beitrag zur Unternehmenssteuerung leisten kann", Versicherungswirtschaft, Verlag Versicherungswirtschaft GmbH, Karlsruhe, Germany, pp. 242-245 (Apr. 2002).

* cited by examiner

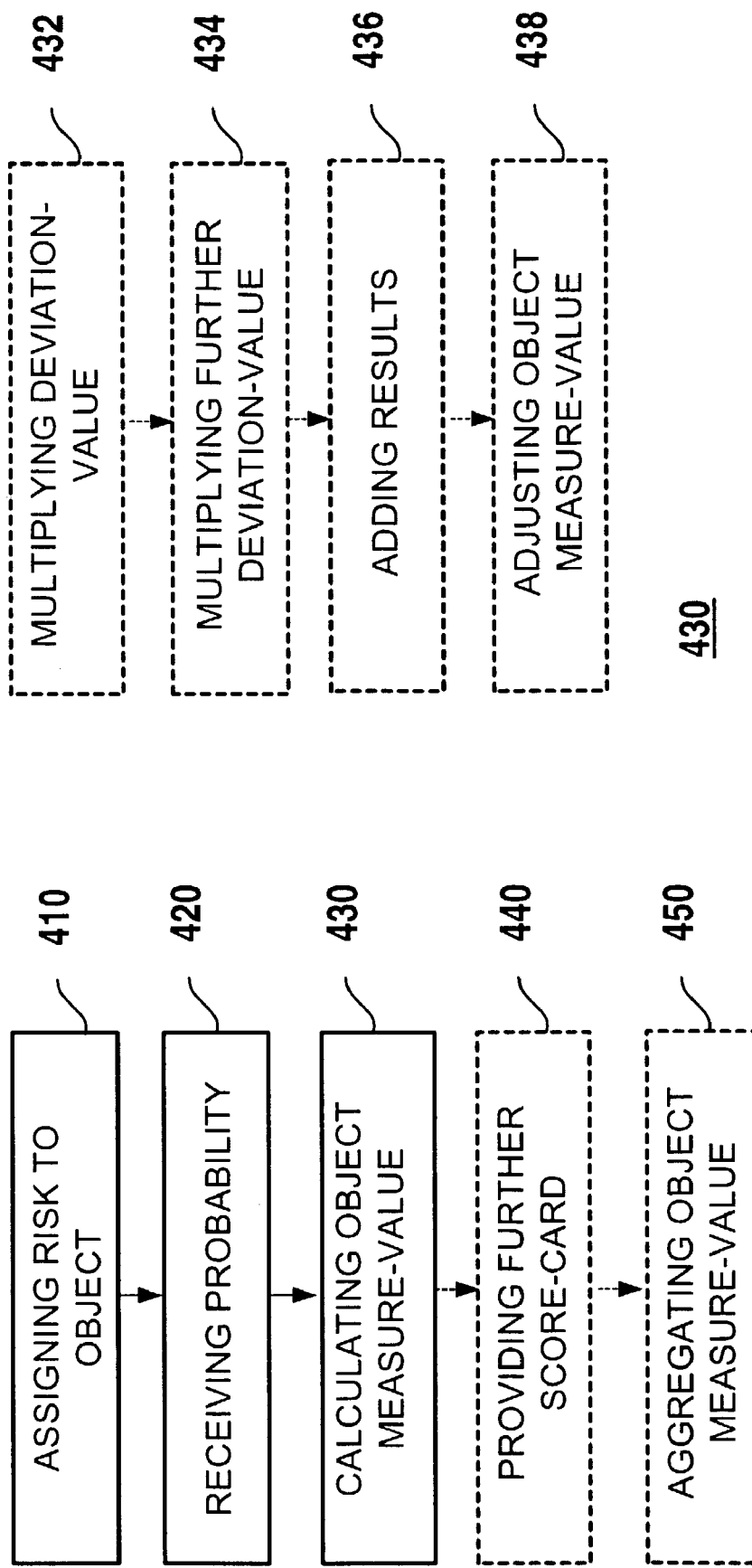

SYSTEM AND METHODS AND RISK EVALUATION USING AN OBJECT MEASURE-VALUE IN STRATEGIC PLANNING

CROSS-REFERENCE TO RELATED APPLICATIONS

This application claims the benefit of priority of U.S. provisional patent application 60/355,833, filed Feb. 13, 2002, and European patent application EP 02013603.2, filed June, 2002, Jun. 19, 2002, both of which are expressly incorporated herein by reference.

BACKGROUND OF THE INVENTION

1. Field of the Invention

The present invention generally relates to electronic data processing. More particularly, the invention relates to methods, computer program products and systems for evaluating risks, such as risks in strategic planning and other applications.

2. Description of Related Art

Key-figures (also referred to as measures, hereinafter) are used by enterprises to monitor performance of their strategic processes. For example, a key-figure "number of visits to prospects" might have a causal relationship to the "number of new customer acquisitions," which can be used as a measure for a business development process. In the end, the "number of new customer acquisitions" has a direct impact on the "turnover" key-figure of the enterprise and becomes important for the financial result.

Strategic planning usually includes a projection of how the enterprise expects these key-figures to develop in the future. Often, a financial goal is set and the causal relationships of the various key-figures are used to plan and control the corresponding processes that have an impact on financial results. There is an ongoing need to evaluate uncertainties that come along with strategic planning.

SUMMARY OF THE INVENTION

Methods and systems consistent with the present invention may be used for risk evaluation. A method for risk evaluation consistent with the present invention comprises the steps of assigning a risk to an object, wherein the object has an object measure-value and the risk has at least one threat level; receiving a probability of the at least one threat level, wherein the probability refers to the object; and calculating the object measure-value by using the probability of the at least one threat level and by using a deviation-value that corresponds to the at least one threat level and relates to the object.

A computer program product consistent with the present invention comprises instructions to cause a processor of a computer to execute the steps of assigning a risk to an object, wherein the object has an object measure-value and the risk has at least one threat level; receiving a probability of the at least one threat level, wherein the probability refers to the object; and calculating the object measure-value by using the probability of the at least one threat level and by using a deviation-value that corresponds to the at least one threat level and relates to the object.

A risk evaluation system consistent with the present invention comprises at least one memory for storing an object, a risk and an assignment structure; at least one processor for executing program instructions for assigning the risk to the object using the assignment structure, wherein the object has an object measure-value and the risk has at least one threat level; a bus for receiving a probability of the at least one threat level, wherein the probability refers to the object; and the at least one processor for executing program instructions for calculating the object measure-value by using the probability of the at least one threat level and by using a deviation-value that corresponds to the at least one threat level and relates to the object.

Additional features and advantages of embodiments of the invention will be set forth in the description which follows, and in part will be apparent from the description or may be learned by practice of the invention.

It is to be understood that the foregoing general description and the following detailed description is exemplary and explanatory only and is not restrictive of the invention as described.

BRIEF DESCRIPTION OF THE DRAWINGS

FIGS. 8A, 8B illustrate steps of a risk evaluation method according to one embodiment of the present invention.

DETAILED DESCRIPTION

By taking into account the impact of risks in a strategic management system, an embodiment of the present invention allows a user to better control the strategic management system for improving the quality of predictions made by the strategic management system.

In accordance with an embodiment of the present invention, a risk evaluation system is provided that includes a memory storing an assignment structure. It further includes a processor that is programmed for assigning a risk to an object using the assignment structure. Examples of the object in a strategic enterprise management context are strategy, strategy-element, perspective, objective, target, initiative and measure. The object has an object measure-value. The object measure-value, as used hereinafter, represents a (latest) estimate of a value that relates to one or more specific values of the object. Specific values of the object can be plan values, actual values, variances, target values or other calculated values. A risk, as used hereinafter, is a representation of a possible event that creates uncertainty for an object measure-value. The impact of a risk on a specific object can be measured by a (risk) expectation-value. Examples for the expectation-value are impact of new competitors on turnover, impact of demographic factors on insurance payments, impact of political crisis on oil price or any other factor whose impact on the object measure-value is uncertain. The processor executes program instructions for calculating the object measure-value by using the risk expectation-value(s).

In another embodiment of the object is a component of a score-card. A score-card, as used hereinafter, includes a plurality of objects, wherein the objects can have relationships that indicate interdependencies between objects. Examples of score-cards are "Balanced Score-Cards" or "Value Driver Trees" used in Strategic Enterprise Management to monitor the performance of enterprises, score-cards to monitor the performance of funds, score-cards to monitor reliability of various car brands or any other score-card to monitor values related to a specific field.

Wherever possible, the same reference numbers will be used throughout the drawings to refer to the same or like parts. For convenience of explanation a list of references is provided prior to the claims.

Figure 1:
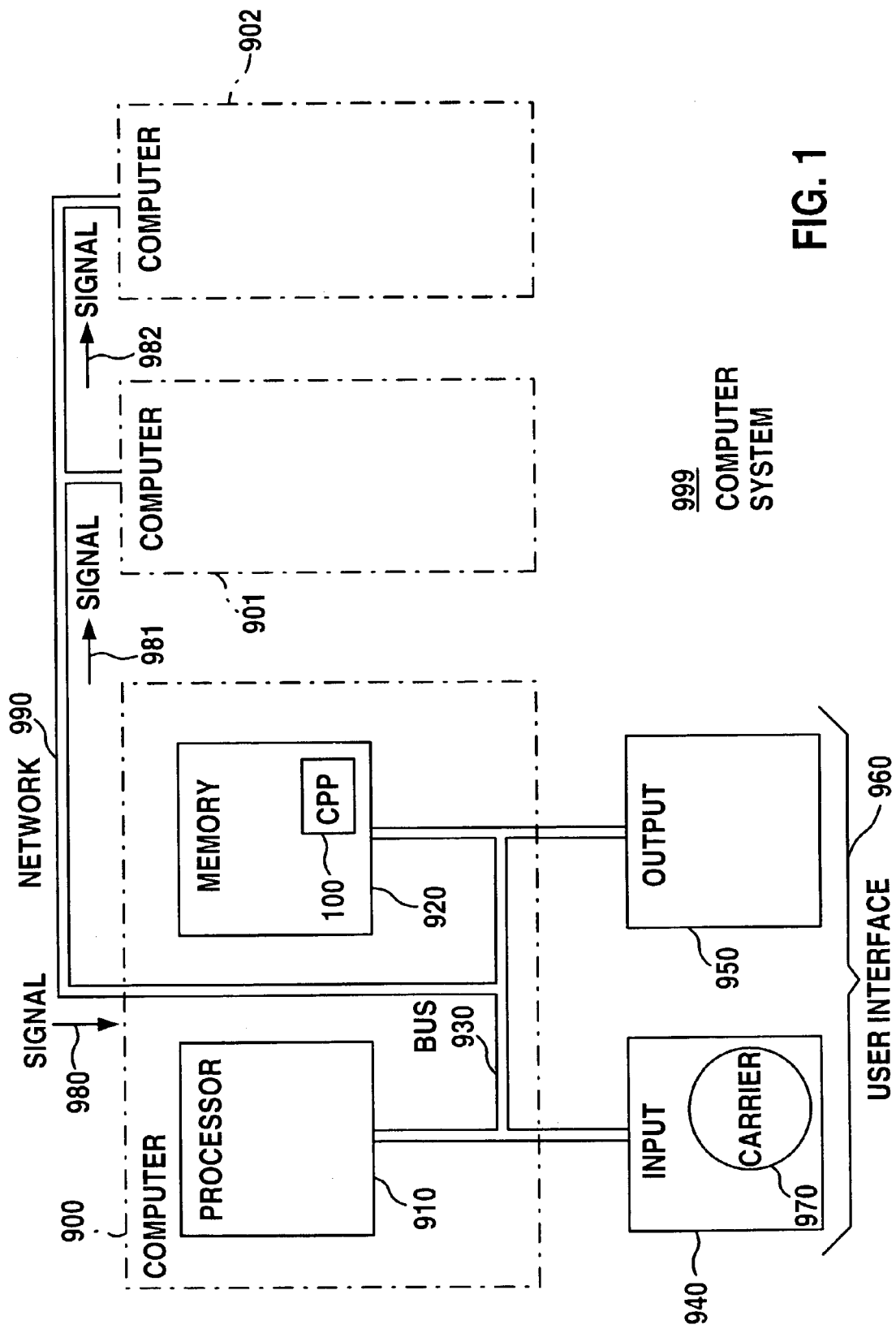
FIG. 1 illustrates a simplified block diagram of an exemplary computer system, which may be used to implement embodiments of the present invention.

FIG. 1 illustrates an exemplary computer system 999, which may be used to implement embodiments of the present invention. Computer system 999 includes computer 900 and optionally can have a plurality of further computers 901, 902 (or 90q, with q=0 . . . Q−1, Q any number).

In the case of multiple computers, computer 900 may be connected to further computers 901, 902 via computer network 990. Computer 900 comprises processor 910, memory 920, bus 930, and, optionally, input device 940 and output device 950 (I/O devices, user interface 960). As illustrated, the invention is present by computer program product 100 (CPP), program carrier 970 and program signal 980, collectively "program".

In respect to computer 900, computer 901/902 is sometimes referred to as "remote computer", computer 901/902 is, for example, a server, a router, a peer device or other network node, and typically comprises many or all of the elements described relative to computer 900. Hence, elements 100 and 910-980 in computer 900 collectively illustrate also corresponding elements 10q and 91q-98q (shown for q=0) in computers 90q.

Computer 900 is, for example, a conventional personal computer (PC), a desktop and hand-held device, a multiprocessor computer, a pen computer, a microprocessor-based or programmable consumer electronics, a minicomputer, a mainframe computer, a personal mobile computing device, a mobile phone, a portable or stationary personal computer, a palmtop computer or the like.

Processor 910 is, for example, a central processing unit (CPU), a micro-controller unit (MCU), digital signal processor (DSP), or the like.

Memory 920 symbolizes elements that temporarily or permanently store data and instructions. Although memory 920 is conveniently illustrated as part of computer 900, memory function can also be implemented in network 990, in computers 901/902 and in processor 910 itself (e.g., cache, register), or elsewhere. Memory 920 can be a read only memory (ROM), a random access memory (RAM), or a memory with other access options. Memory 920 is physically implemented by computer-readable media, such as, for example: (a) magnetic media, such as a hard disk, a floppy disk, or other magnetic disk, a tape, a cassette tape; (b) optical media, such as optical disk (CD-ROM, digital versatile disk—DVD); (c) semiconductor media, such as DRAM, SRAM, EPROM, EEPROM, memory stick, or by any other media, such as paper.

Optionally, memory 920 is distributed across different media. Portions of memory 920 can be removable or non-removable. For reading from media and for writing in media, computer 900 uses devices well known in the art such as, for example, disk drives, tape drives.

Memory 920 stores support modules such as, for example, a basic input output system (BIOS), an operating system (OS), a program library, a compiler, an interpreter, and a text-processing tool. Support modules are commercially available and can be installed on computer 900 by those of skill in the art. For simplicity, these modules are not illustrated.

CPP 100 comprises program instructions and—optionally—data that cause processor 910 to execute method steps of the present invention. Method steps are explained with more detail below. In other words, CPP 100 defines the operation of computer 900 and its interaction in network system 999. For example and without the intention to be limiting, CPP 100 can be available as source code in any programming language, and as object code ("binary code") in a compiled form.

Persons of skill in the art can use CPP 100 in connection with any of the above support modules (e.g., compiler, interpreter, operating system).

Although CPP 100 is illustrated as being stored in memory 920, CPP 100 can be located elsewhere. CPP 100 can also be embodied in carrier 970.

Carrier 970 is illustrated outside computer 900. For communicating CPP 100 to computer 900, carrier 970 is conveniently inserted into input device 940.

Carrier 970 is implemented as any computer-readable medium, such as a medium largely explained above (cf. memory 920). Generally, carrier 970 is an article of manufacture comprising a computer-readable medium having computer-readable program code means embodied therein for executing the method of the present invention. Further, program signal 980 can also embody computer program 100. Signal 980 travels on network 990 to computer 900.

Having described CPP 100, program carrier 970, and program signal 980 in connection with computer 900 is convenient. Optionally, program carrier 971/972 (not shown) and program signal 981/982 embody computer program product (CPP) 101/102 to be executed by processor 911/912 (not shown) in computers 901/902, respectively.

Input device 940 symbolizes a device that provides data and instructions for processing by computer 900. For example, device 940 is a keyboard, a pointing device (e.g., mouse, trackball, cursor direction keys), microphone, joystick, game pad, scanner, disk drive. Although the examples are devices with human interaction, device 940 can also operate without human interaction, such as, a wireless receiver (e.g., with satellite dish or terrestrial antenna), a sensor (e.g., a thermometer), a counter (e.g., goods counter in a factory). Input device 940 can serve to read carrier 970.

Output device 950 symbolizes a device that presents instructions and data that have been processed. For example, a monitor or a display, (cathode ray tube (CRT), flat panel display, liquid crystal display (LCD), speaker, printer, plotter, vibration alert device. Similar as above, output device 950 communicates with the user, but it can also communicate with further computers.

Input device 940 and output device 950 can be combined to a single device; any device 940 and 950 can be provided optional.

Bus 930 and network 990 provide logical and physical connections by conveying instruction and data signals. While connections inside computer 900 are conveniently referred to as "bus 930", connections between computers 900-902 are referred to as "network 990". Optionally, network 990 comprises gateways being computers that specialize in data transmission and protocol conversion.

Devices 940 and 950 are coupled to computer 900 by bus 930 (as illustrated) or by network 990 (optional). While the signals inside computer 900 are mostly electrical signals, the signals in network are electrical, magnetic, optical or wireless (radio) signals.

Networking environments (as network 990) are commonplace in offices, enterprise-wide computer networks, intranets and the internet (i.e. world wide web). The physical distance between a remote computer and computer 900 is not important. Network 990 can be a wired or a wireless network. To name a few network implementations, network 990 is, for example, a local area network (LAN), a wide area network (WAN), a public switched telephone network (PSTN); a Integrated Services Digital Network (ISDN), an infra-red (IR) link, a radio link, such as Universal Mobile Telecommunications System (UMTS), Global System for Mobile Communication (GSM), Code Division Multiple Access (CDMA), or satellite link.

Transmission protocols and data formats are known, for example, as transmission control protocol/internet protocol (TCP/IP), hyper text transfer protocol (HTTP), secure HTTP, wireless application protocol, unique resource locator (URL), a unique resource identifier (URI), hyper text markup language HTML, extensible markup language (XML), extensible hyper text markup language (XHTML), wireless application markup language (WML), Standard Generalized Markup Language (SGML) etc.

Interfaces coupled between the elements are also well known in the art. For simplicity, interfaces are not illustrated. An interface can be, for example, a serial port interface, a parallel port interface, a game port, a universal serial bus (USB) interface, an internal or external modem, a video adapter, or a sound card.

Computer and program are closely related. As used hereinafter, phrases, such as "the computer provides" and "the program provides", are convenient abbreviation to express actions by a computer that is controlled by a program.

Figure 2A:
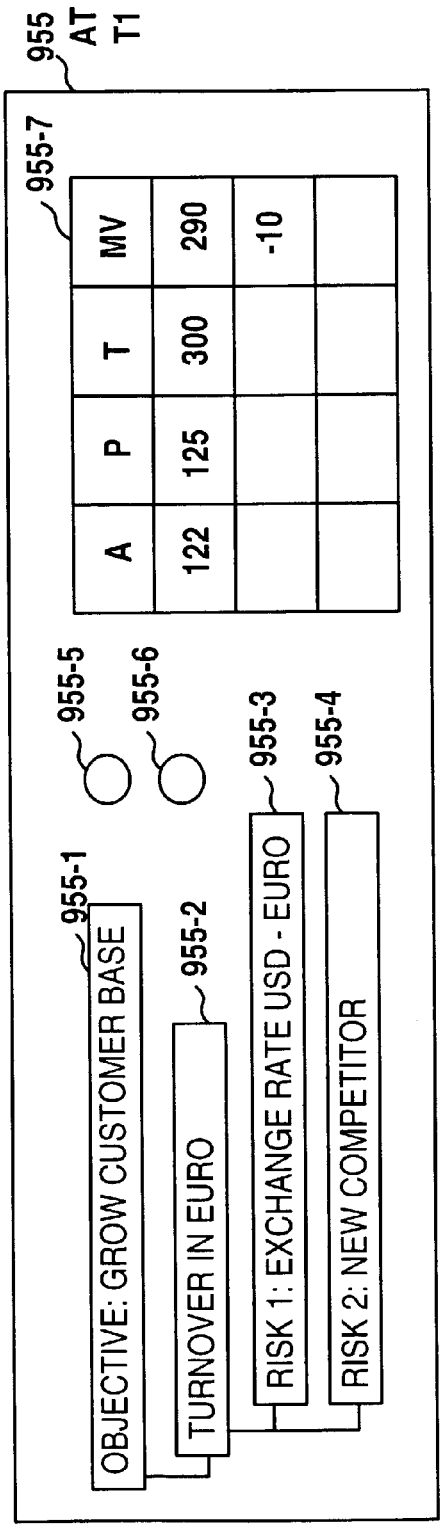
FIGS. 2A, 2B illustrate an example of a graphical user interface that is generated by a computer which is operated according to one embodiment of the present invention.
Figure 2B:
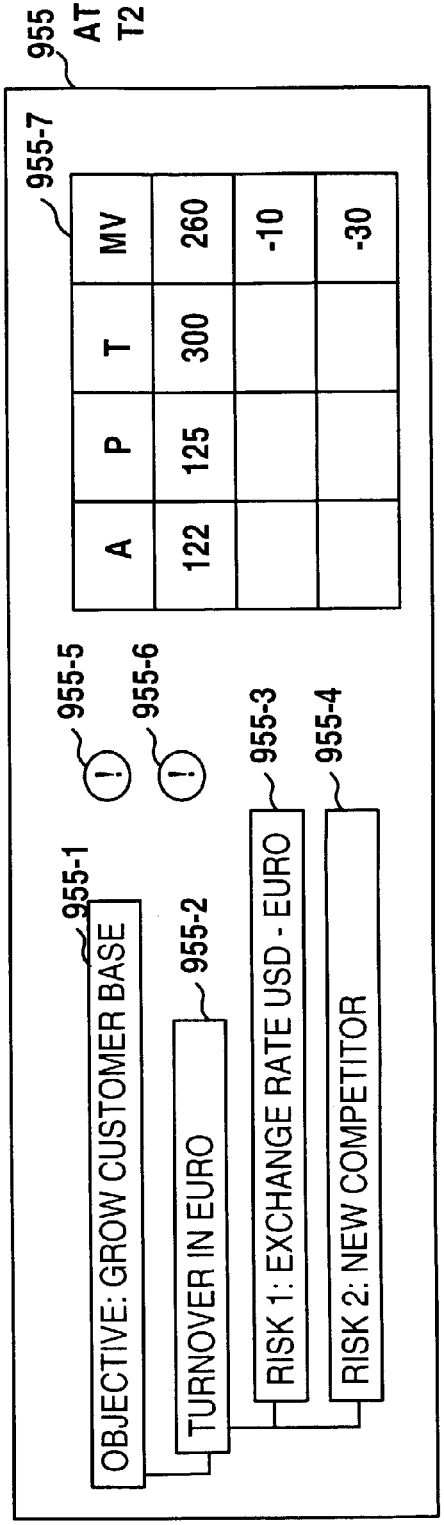

FIGS. 2A, 2B illustrate an example of a graphical user interface (GUI) 955 that may be generated by a computer 900 (cf. FIG. 1) which is operated according to one embodiment of the present invention. For example, GUI 955 is visualized for a user via output device 950 (cf. FIG. 1) at two different time points T1 (cf. FIG. 2A) and T2 (cf. FIG. 2B). T2 is after T1.

The following scenario will be referred to as an example in the detailed description of the present invention. However, the scenario is not meant to limit the scope of the invention.

At T1, GUI 955 includes layout-components 955-1 to 955-7. GUI 955 may be part of an application to plan and track objectives of an enterprise. In the example, GUI 955 shows a portion of a score-card. In this embodiment, layout-component 955-1 (objective) shows one objective of the enterprise: "OBJECTIVE: GROW CUSTOMER BASE". The enterprise can use multiple measures to plan and track this objective. One measure that is assigned to the objective is shown in layout-component 955-2 (turnover): "TURNOVER IN EURO". An increase in turnover can be an indicator for customer base growth. Layout-components 955-3 (risk 1) and 955-4 (risk 2) show two risks that are assigned to turnover 955-2 because they may have impact on the enterprise's turnover: "RISK 1:EXCHANGE RATE USD-EURO" and "RISK 2:NEW COMPETITOR". Fluctuations in currency exchange rates can heavily impact the turnover in the enterprise's home currency.

New competitors entering the market can gain market share from the enterprise and also account for reduced turnover.

In this embodiment, layout-component 955-7 (table) is a table that includes cells to present values to and/or receive values from the user.

In the example of FIGS. 2A, 2B the first row of table 955-7 refers to the turnover in USD. Column A includes actual values. The actual value of the turnover in USD is "122" (e.g. for a given period, such as the first two quarters of the business year). Column P includes the corresponding plan value, which is "125". Column T includes a target value for the turnover (e.g. for the full business year). The column MV shows the (latest) measure-value "290" (also referred to as object-measure-value) for the corresponding target value "300".

In the second row of table 955-7, column MV shows the impact of risk 1 on the target value "300". This indicates to the user that the impact of the currency exchange rate risk is currently assumed to reduce the target value "300" of the turnover by "10", which leads to the measure-value "290".

At T2, the situation has changed for the enterprise. For example, new competitors unexpectedly entered the market. The new competitors may use aggressive pricing to gain market share. The sales manager of the enterprise expects to lose customer orders to the new competitors. Therefore, the sales manager can make a probability analysis of the possible impact on turnover. The result of the probability analysis ("−30" in column MV) corresponds to the impact of risk 2 on the target value. The computer re-calculates the measure-value of the turnover by reducing the amount to "260" according to the risk 2 impact.

In the example of FIG. 2A, layout-component 955-6 (risk status) indicates (!) to the user that the sum of all risks assigned to the turnover exceeded a given threshold value (e.g. 10%). Any other visual or audio representation of the risk status can be used (e.g. bullets with different colours, icons, sound signals, etc.). At T1, the risk status 955-6 is still empty. Preferably, the risk status of each measure is consolidated and results in a risk status (layout component 955-5) for target 955-1 itself. Therefore, at T1, risk status 955-5 is changed (e.g. from empty to "!").

Any GUI supporting the features of the present invention can be used. For example, the GUI can include further layout-components to represent score-cards, strategies, strategy, strategy-elements, perspectives, targets, objectives, risks, measures or any other layout-component that can be relevant for strategic enterprise management. The layout-components can have relationships defined by assignments, such as: perspective-to-score-card assignments, objective-to-perspective assignments, measure-to-objective assignments, measure-to-target assignments and risk-to-measure assignments. Any other assignment that supports strategic enterprise management may be defined. Values in table 955-7 can use other layout-components, such as input fields, output fields, rows, columns, etc. with appropriate navigation tools, such as scroll bars, data set selectors and drop-down menus.

The explanatory scenario refers to a business environment where one embodiment of the present invention is used to monitor the performance of an enterprise and facilitate decision making. Other scenarios relating to other environments, such as decision support in politics, conflict situations, buying/purchasing, medical treatment, etc., may be implemented by using alternative embodiments of the present invention.

Figure 3:
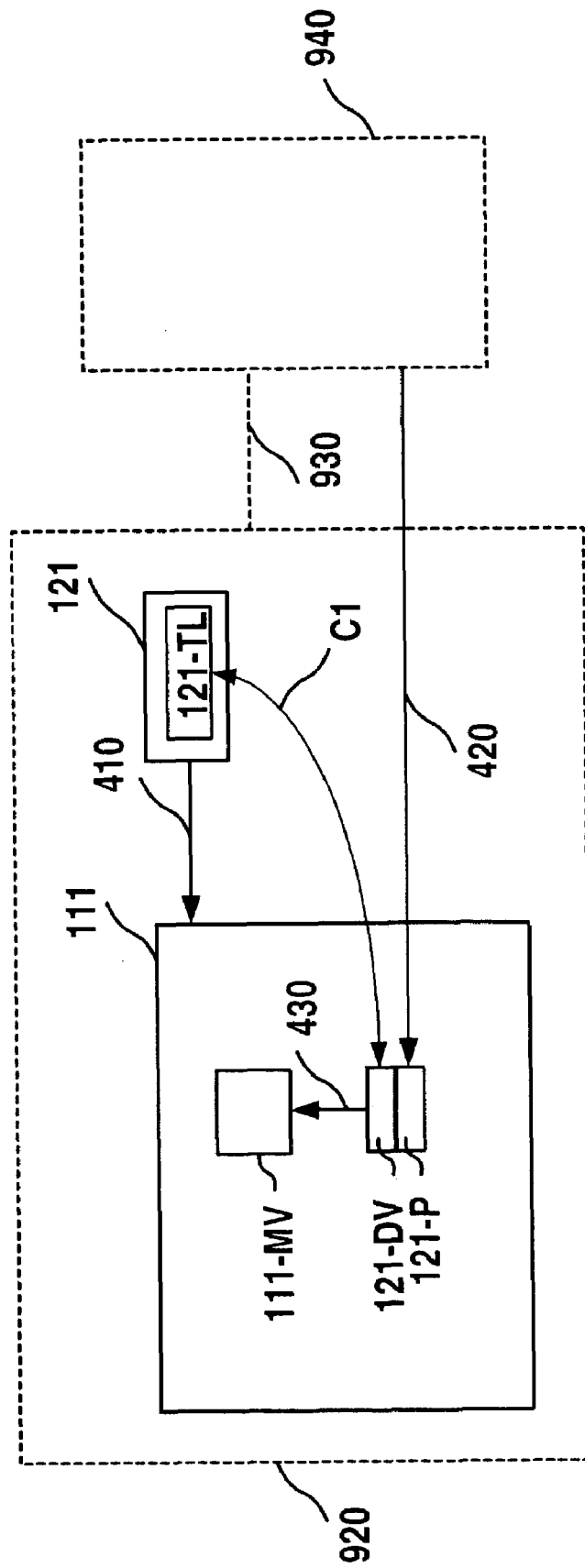
FIG. 3 illustrates details of an implementation of a risk evaluation system according to one embodiment of the present invention.

FIG. 3 illustrates details of an implementation of a risk evaluation system according to one embodiment of the present invention. Hardware components of computer 900

(cf. FIGS. 2A, 2B) are illustrated by dashed lines/frames. Software components are illustrated by solid lines/frames.

As explained earlier in FIG. 1, input device 940 can be connected to memory 920 via bus 930.

Memory 920 stores at least one predefined risk 121 and at least one predefined object 111. Alternatively, risks and objects can be stored on different storage devices of computer system 999 (cf. FIG. 1). Other possibilities of storage would be known to those skilled in the art and thus are within the scope of the present invention. In one example, object 111 is a measure and has object measure-value 111-MV. In the example of FIGS. 2A, 2B, object measure-value 111-MV of object 111 corresponds to the value in column MV of table 955-7 for turnover 955-2. Object 111 can also be a strategy, strategy-element, a perspective, an objective, a target, a measure or any other object that is used in strategic enterprise management. In other words, the present invention is not dependent on the meaning of any of the layout-components in FIGS. 2A, 2B.

When assigning 410 risk 121 to object 111, for example, memory 920 stores the assignment in a corresponding data structure, such as a relational database table, known by those skilled in the art. Risk 121 has at least one threat level 121-TL. A threat level of a risk indicates how big the impact of the risk can be. The risk can have multiple threat levels ranging, for example, from SMALL to BIG or from 0 to 4.

Referring back to the example of FIGS. 2A, 2B, the sales manager may enter via input device 940 (e.g. a keyboard) probability 121-P of the at least one threat level 121-TL. In the example, probability 121-P refers to turnover measure 111. In case risk 121 has multiple threat levels, the sales manager may enter a corresponding probability for each threat level, thus defining a probability distribution for the various threat levels. After having received 420 probability 121-P of the at least one threat level 121-TL, computer 900 calculates 430 object measure-value 111-MV by using probability 121-P of the at least one threat level 121-TL and by using deviation-value 121-DV. Deviation-value 121-DV corresponds C1to the at least one threat level 121-TL and relates to object 111. Deviation-value 121-DV quantifies the impact of the corresponding threat level 121-TL on the object measure-value 111-MV. For example, deviation-value 121-DV has a value type, such as absolute number, absolute delta, percentage or percentage delta. In the example of FIG. 2A, target value "300" is reduced by risk 1 by an amount of "10". Assuming that the reduction is caused by a single threat level of risk 1, the corresponding deviation-value would be: "290" as an absolute value, "–10" as an absolute delta, "96.6%" in percentage and "3.3%" in percentage delta. Preferably, deviation-value 121-DV is predefined in computer system 999 (cf. FIG. 1), for example, in a customizing table of computer system 999. Alternatively, a user, such as the sales manager, can define a deviation-value for each threat level of a risk, when the risk is assigned to a specific object.

In one embodiment of the present invention, memory 920 receives probability 121-P via bus 930. In another embodiment, probability 121-P can be received from any computer or input device in computer system 999 (cf. FIG. 1). This includes also any computer that might be linked to computer 900 via the internet or any other network like WAN or LAN networks. Then, computer 900 re-calculates 430 object measure-value 111-MV by taking into account probability 121-P and deviation-value 121-DV. For example, an expectation-value can be calculated as a measure of risk impact for each risk. Details of the re-calculation are explained in FIG. 3.

If multiple risks are assigned to an object, the impact of each risk on the object measure-value is taken into account when calculating the object-measure-value. For example, the estimation-values of various risks assigned to the object can be added, averaged, weighted averaged or factored.

By making the impact of risks on measures apparent, the present invention allows the impact of risks on strategic measures of an enterprise to be considered in the strategic planning process of the enterprise.

Figure 4:
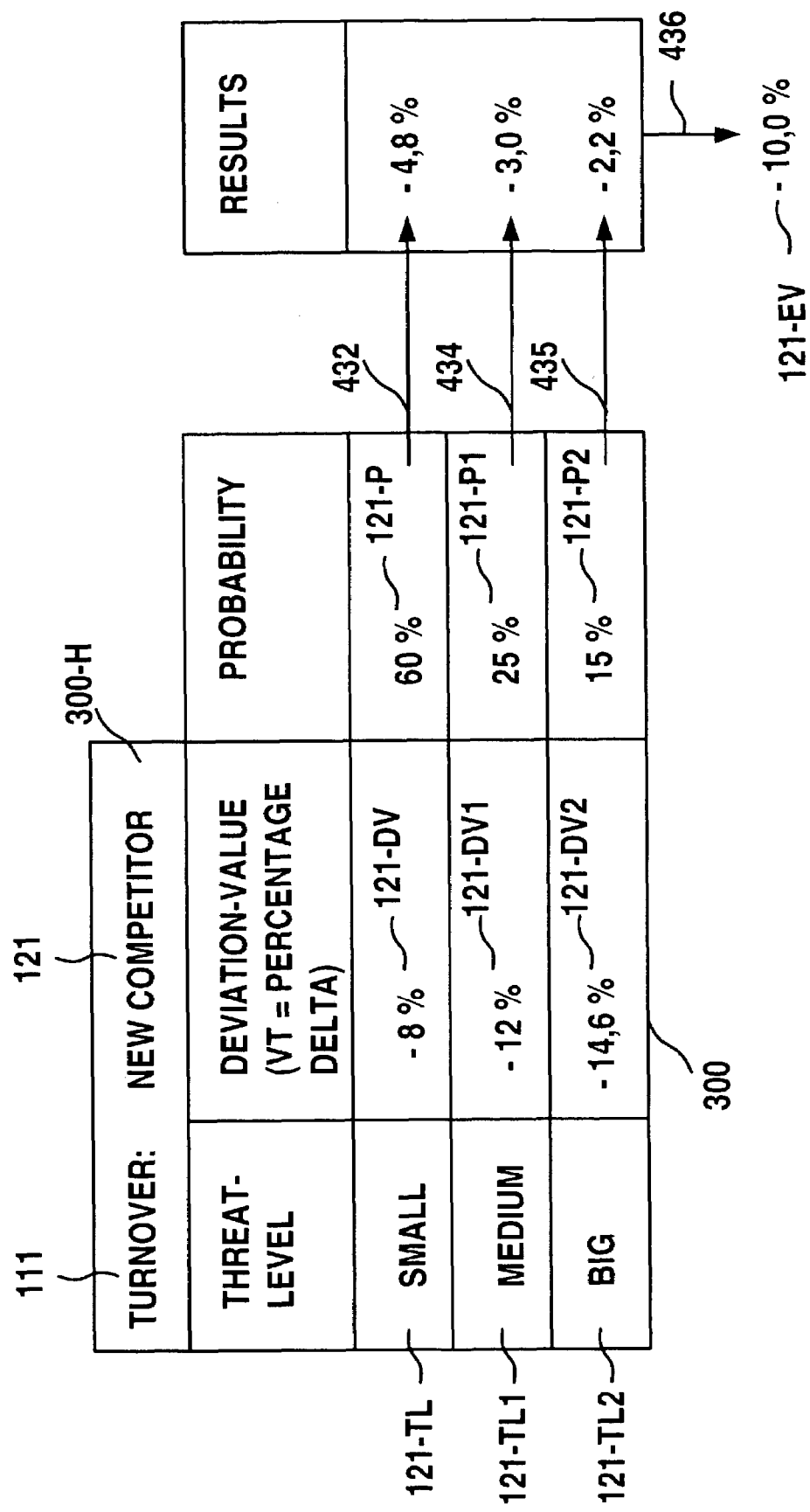
FIG. 4 illustrates details of one embodiment of calculating an object-measure value of an object by taking into account the impact of a risk.

FIG. 4 illustrates details of one embodiment of calculating 430 object-measure value 111-MV of object 111 by taking into account the impact of risk 121.

Header 300-H of risk matrix 300 indicates that risk matrix 300 includes data to determine expectation value 121-EV of risk 121 (NEW COMPETITOR) that is assigned to object 111 (TURNOVER). In one embodiment of the invention the layout of risk matrix 300 can be part of a graphical user-interface for receiving risk data from a user. In the example of FIG. 4, risk matrix 300 has columns THREAT LEVEL, DEVIATION-VALUE and PROBABILITY.

For convenience of explanation, risk 121 has threat levels 121-TL (SMALL), 121-TL1 (MEDIUM) and 121-TL2 (BIG). Risk 121 can have any number of threat levels with any value. A deviation-value is assigned to each threat level in column DEVIATION-VALUE with regards to the object measure-value 111-VM of object 111. In the exampled, the deviation-values have the value type (VT) percentage delta. Deviation-values 121-DV (–8%), 121-DV1 (–12%) and 121-DV2 (–14.6%) correspond to the threat-values SMALL, MEDIUM and BIG, respectively. In column PROBABILITY, probabilities 121-P (60%), 121-P1(25%) and 121-P2(15%) risk matrix 300. In other words, according to risk matrix 300 the probability of threat level SMALL that the achievable turnover is 8% less than the original target-value ("300", cf. FIG. 2B) is assumed to be 60% due to new competitors. The further rows of table matrix 300 for threat levels MEDIUM and BIG are to be read the same way.

Therefore, table-matrix 300 describes a probability distribution of the various deviation values that correspond to the various threat levels. In an alternative embodiment probabilities can also be received as non-percentage values that are automatically normalized by computer 900.

In the example, computer 900 determines expectation-value 121-EV by multiplying 432, 434, 435 each probability 121-P (60%), 121-P1(25%), 121-P2 (15%) with the corresponding deviation-value 121-DV (–8%), 121-DV1(–12%), 121-DV2 (–14,6%) respectively and by adding 436 the results of the corresponding RESULTS vector. In the example, expectation-value 121-EV equals –10% (of the target value), which corresponds to the risk 2 impact of "–30" in FIG. 2B. computer 900 then adds the risk 2 impact to the measure-value "290" (cf. FIG. 2A) resulting in the re-calculated measure-value "260" (cf. FIG. 2B).

Figure 5:
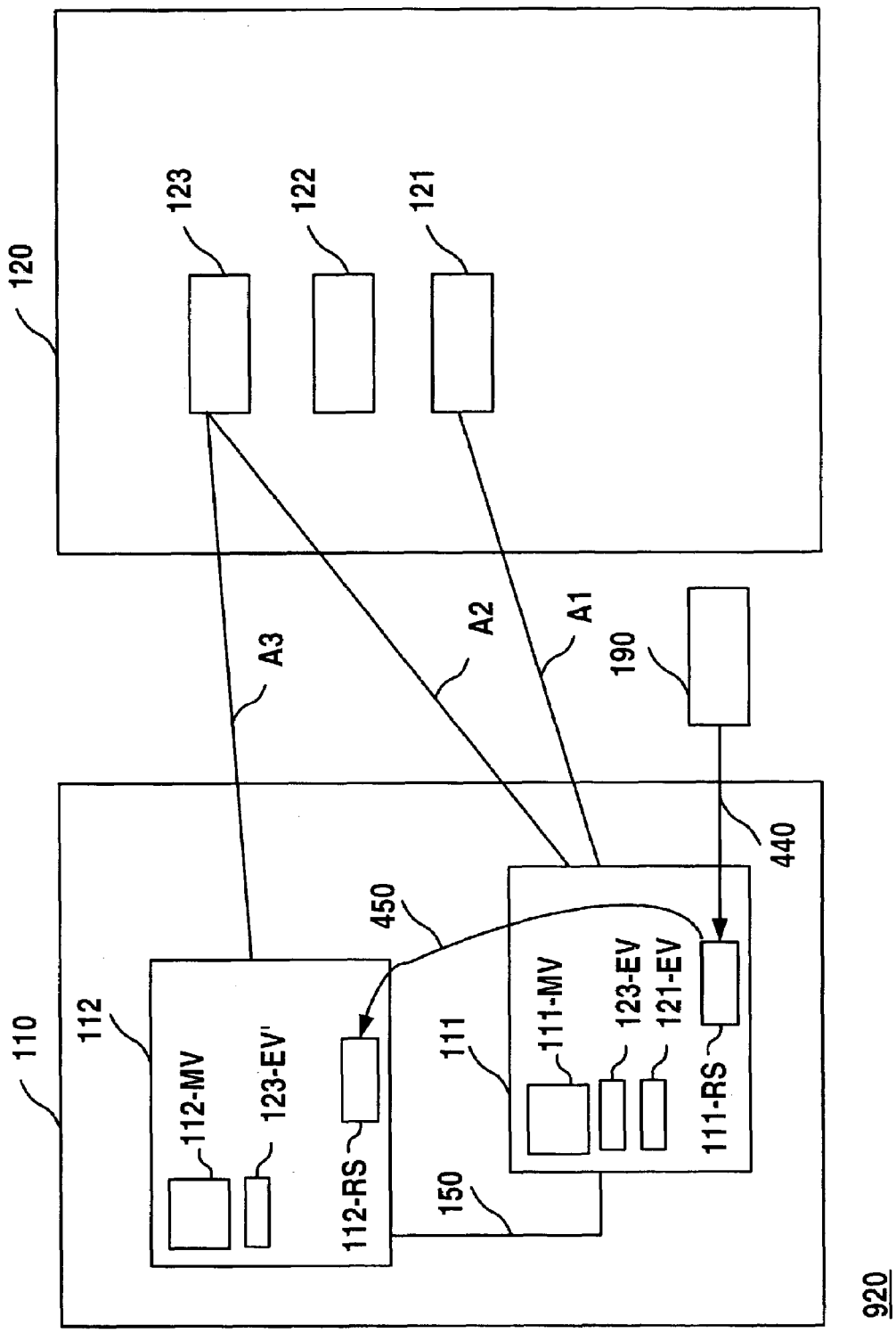
FIG. 5 illustrates further details of a memory in one embodiment of the risk evaluation system of the present invention.

FIG. 5 illustrates further details of memory 920 in one embodiment of the risk evaluation system of the present invention.

In one embodiment of the present invention, object 111 is a component of score-card 110. Score-card 110 can have further objects, such as measures, objectives, perspectives, targets or any other object relevant to strategic enterprise management. In one example, further object 112 is an objective. Objects in score-card 110 can have hierarchical relationships with each other. In the example, object 111 (measure) is a child of further object 112 (objective). This is indicated by parent-child relation 150. Other combinations for relationships are possible, such as perspective-to-score-card relationships, objective-to-perspective relationships, measure-to-objective relationships, measure-to-objective relationships and risk-to-measure relationships. Any other relationship that supports strategic enterprise management may be defined. As known by those skilled in the art, hierarchical relationships can be stored in a hierarchy data structure. One embodiment of the hierarchy data structure can be a database table having parent-child data sets. Another embodiment can be a markup language file, such as an XML or XHTML file, where a tag hierarchy reflects the hierarchical relationships. For example, a tag representing further object 112 (parent) has a further tag representing object 111 (child).

Each object 111, 112 has its object measure-value 111-MV, 112-MV, respectively. In the example, risks 121, 123 are assigned A1, A2 to object 111 and result in the corresponding expectation-values 121-EV, 123-EV. Risk 123 is also assigned A3 to further object 112 resulting in corresponding expectation-value 123-EV'.

Referring back to the scenario of FIGS. 2A, 2B, the sales manager is more likely in a position to estimate a probability distribution of multiple threat levels of the risk of NEW COMPETITORS than to estimate the expectation value that results from the probability distribution.

Preferably, risk 121 is a component of risk-catalogue 120. Risk-catalogue 120 can store further risks 122, 123. Each risk in risk-catalogue can be assigned to each object in score care 110 and each object can have each risk assigned to it.

Optionally, each object 111, 112 has a risk status 111-RS, 112-RS, respectively. The risk status of an object provides an aggregate view on the total impact of all risks assigned to the object. For example, risk status 111-RS of object 111 takes into account risk expectation-values 121-EV, 123-EV. In the example of FIGS. 2A, 2B, a visualization (e.g. "!") of risk status 111-RS is presented to the user via layout-component 955-6. For example, in one implementation of an embodiment of the present invention risk status 111-RS is calculated 440 by comparing the total impact of risks assigned to object 111 with a predefined threshold value. In another implementation, risk status 111-RS is calculated 440 by using predefined rules. The predefined threshold values or rules are stored in rule-set 190. For example, rules in rule-set 190 can be dynamic by varying the threshold value depending on a certain base value, such as plan value, actual value or target value (cf. FIGS. 2A, 2B) or any other value that is relevant for the object and might be calculated by using the aforementioned values. Rule-set 190 can also include rules that describe the impact of risk-status 111-RS on further risk-status 112-RS of further object 112. Computer 900 calculates 450 further risk-status 112-RS by taking into account risk status 111-R. Preferably, when calculating 450 further risk-status 112-RS, the total impact of risks (e.g. 123-EV') assigned to further object 112 is also considered.

The risk status of an object provides an aggregate view on the impact of all risks assigned to the object. By using relationships between various objects, the risk status of one object can impact the risk status of a further object, when the further object is a parent of the object. This provides a consistent overview of the impact of all risks on all objects within score-card 110.

Figure 6:
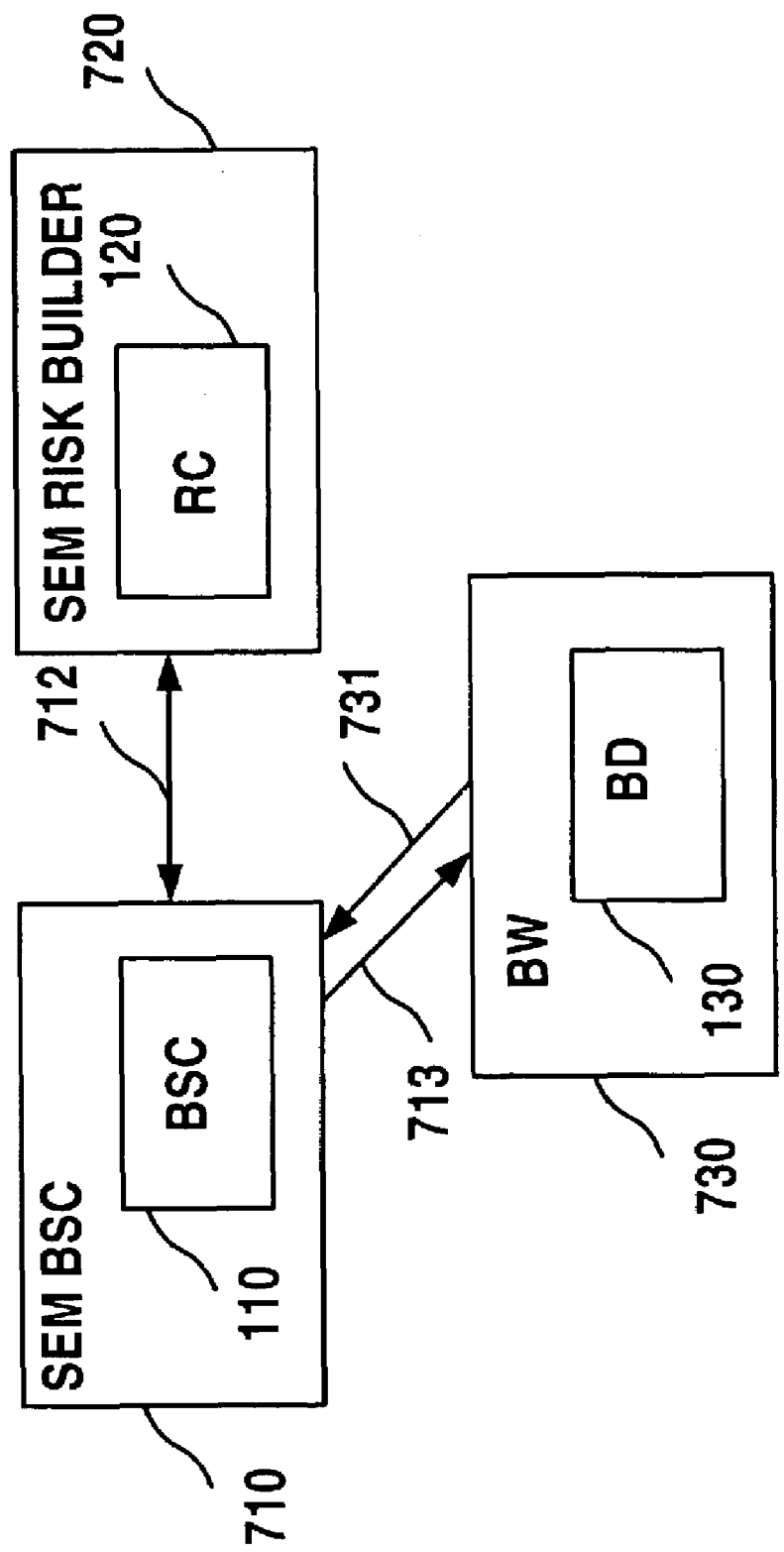
FIG. 6 illustrates an alternative embodiment of the present invention.

FIG. 6 illustrates an alternative embodiment of the present invention. A score-card 110, such as a balanced score-card (BSC), is provided by a strategic enterprise management component 710, such as the SEM BSC solution of SAP AG, and a risk catalogue 120 (RC) is provided by a risk management component, such as the SEM Risk Builder of SAP AG. For example, values of BSC objects can be derived 731 from business data 130 (BD) stored in a data warehouse 730, such as the Business Information Warehouse (BW) of SAP AG. The values of the BSC objects can be stored 713 in the data warehouse 730. By combining 712 a strategic enterprise management component 710 with a risk management component 720, the user is provided with a solution to better evaluate uncertainties related to risks that have impact on plan values for any object, such as strategy elements, perspectives, objectives, targets, measures, etc.

Figure 7:
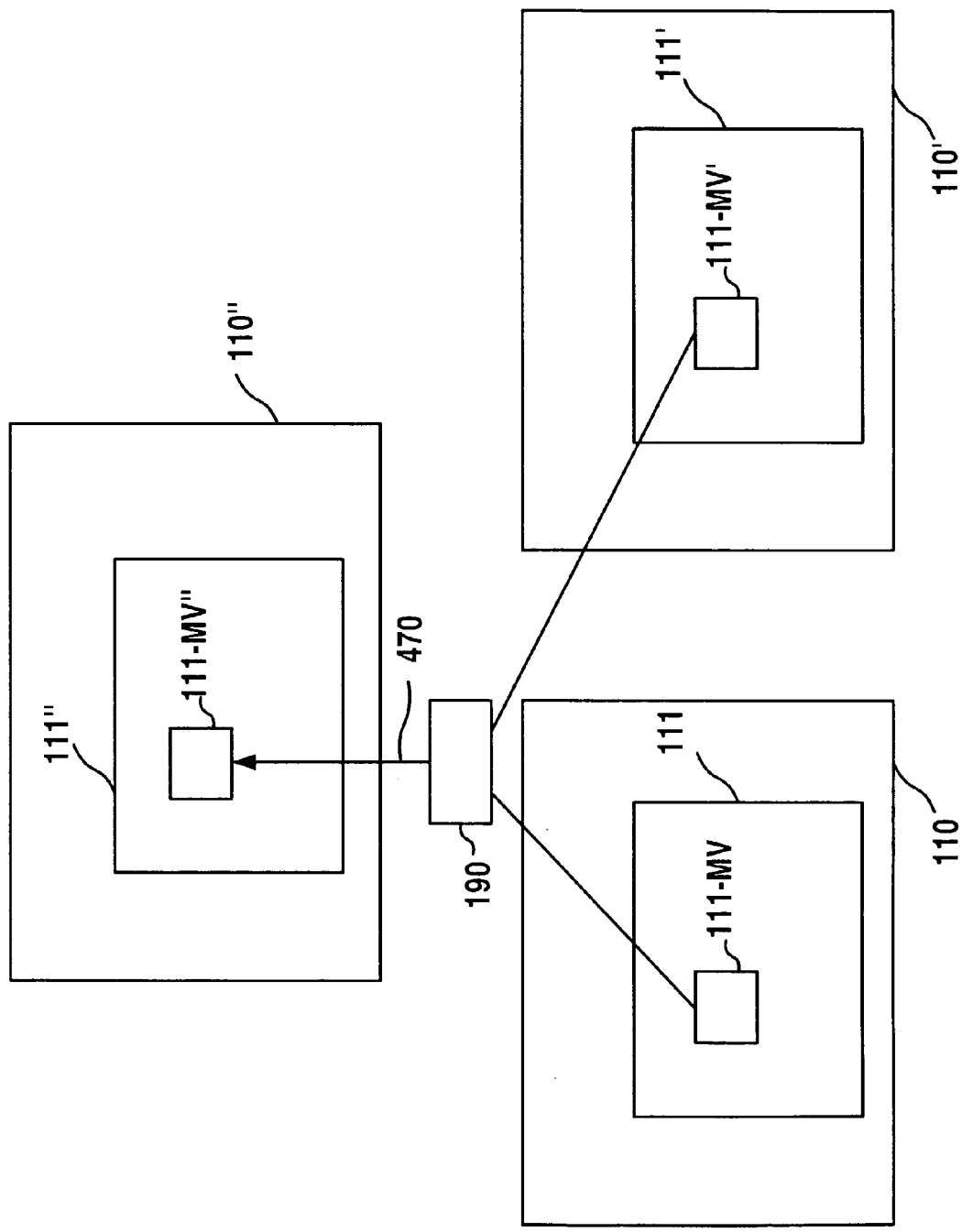
FIG. 7 illustrates aggregation of objects in different scorecards used in one embodiment of the present invention.

FIG. 7 illustrates aggregation of objects 111, 111' into similar object 111" used in one embodiment of the present invention, wherein the objects 111, 111' and the similar object 111" can belong to different score-cards 110, 110', 110", respectively.

In one implementation, computer 900 (cf. FIG. 1) provides multiple score-cards 110, 110', 110" in memory 920. In another implementation, the score-cards 110, 110', 110" can be distributed over multiple storage devices of computer system 999. For example, the functionality of score-cards 110', 110" is substantially equivalent to the functionality of score-card 110. In another implementation, the different score-cards can be stored in different storage locations of computer system 999 (cf. FIG. 1).

For example, each score-card 110, 110', 110" stores at least one object 111, 111', 111", respectively. Objects 111, 111', 111" are similar. Similar, as used hereinafter, means that the objects are of the same type (e.g. strategy, strategy-element, perspective, objective, target, measure) and refer to the same instance of this type (e.g. measure turnover). Each object 111, 111', 111" has a corresponding object measure-value 111-MV, 111-MV', 111-MV".

In one embodiment of the present invention, computer 900 aggregates 470 estimation-values of objects 111, 111' (e.g. object measure-value 111-MV and indexed object measure-value 111-MV') into corresponding object measure-values of similar object 111" (e.g. corresponding object measure-value 111-MV") by using rule-set 190. That is, estimation-values of objects 111, 111' are processed according to rules defined in rule-set 190 and the result is written to the corresponding object measure-value of object 111". For example, corresponding object measure-value 111-MV" in score-card 110" is the result of adding object measure-value 111-MV and indexed first 111-MV' of score-cards 110, 110'. Another rule of rule-set 190 may calculate corresponding object measure-value 111-MV" as the average or weighted average of object measure-value 111-MV and indexed object measure-value 111-MV'. A person skilled in the art can defined further rules of rule-set 190 as they are required by an enterprise for strategic enterprise management. Multiple estimation-values can be aggregated in aggregation step 470 substantially simultaneously.

By aggregating objects of different score-cards into an object of another score-card, one embodiment of the present invention allows a manager to get a consolidated view of the strategic plan of an enterprise from a single score-card (e.g. score-card 111").

FIGS. 8A, 8B illustrate steps of a risk evaluation method 400 according to one embodiment of the present invention. Method 400 may be executed by a computer, such as computer 900 (cf. FIG. 1) running CPP 100. In one embodiment of the present invention, CPP 100 has a plurality of instructions that cause processor 910 (cf. FIG. 1) of computer 900 to execute the steps of method 400. CPP 100 can be stored on data carrier 970 (cf. FIG. 1) or carried by signal 980 (cf. FIG. 1).

Method 400 includes (cf. FIG. 8A) the steps assigning 410, receiving 420 and calculating 430. Optionally, as illustrated by dashed frames, method 400 may further include steps providing 440 and aggregating 450. The calculating step 430, optionally includes (cf. FIG. 8B) the further steps multiplying deviation-value 432, multiplying further deviation-value 434, adding 436 and adjusting 438.

In the assigning step 410, risk 121 (cf. FIG. 3) is assigned to object 111 (cf. FIG. 3). Assignments can be defined by those skilled in the art using, for example, assignment structures, such as an assignment database table or hierarchical data structures as used in markup language documents (e.g. XML-files, XHTML-files, etc.). In one implementation, risk 121 and object 111 are predefined. In another implementation, risk 121 and object 111 may be created in the assigning step. Object 111 can be selected from the group of strategy, strategy-element, measure, objective, target, or any other object that is meaningful in strategic enterprise management.

Object 111 has object measure-value 111-MV (cf. FIG. 3). In a preferred implementation, object 111 is a component of score-card 110 (cf. FIG. 4) and risk 121 is a component of risk-catalogue 120 (cf. FIG. 4).

In the receiving 420 step, probability 121-P of the at least one threat level 121-TL is received. Probability 121-P refers to object 111. For example, a user can enter probability 121-P in risk matrix 300 (cf. FIG. 4) via an input-device, such as input-device 940 (cf. FIG. 3). In another embodiment of the present invention, probability 121-P can be received from a computer (e.g. computer 901, 902 cf. FIG. 1).

In the calculating 430 step, object measure-value 111-MV is calculated by using probability 121-P of the at least one threat level 121-TL and by using deviation-value 121-DV. Deviation-value 121-DV corresponds C1 to the at least one threat level 121-TL and relates to object 111. Preferably, deviation-value 121-DV has a value type (VT) selected from the group of absolute number, absolute delta, percentage and percentage delta. Preferably, deviation-value 121-DV is predefined in a data structure, such as a customizing table in a database. Alternatively, deviation-value 121-DV can be entered by a user, for example, when assigning risk 121 to object 111 or when entering probability 121-P.

FIG. 8B illustrates steps 432 to 438 being performed for calculating 430 object measure-value 111-MV in case of risk 121 having multiple threat levels.

In the multiplying deviation-value step 432, deviation-value 121-DV is multiplied with probability 121-P.

In the multiplying further deviation-value step 434, at least further deviation-value 121-DV1of further threat level 121-TL1of risk 121 is multiplied with corresponding further probability 121-P1.

In the adding results step 436, the results of the multiplying steps 432, 434 are added. This results in expectation-value 121-EV of risk 121 with regards to object 111. In other words, expectation-value 121-EV refers to a value of object 111. Referring back to the example of FIG. 2B, the value of the object can be the plan value, actual value, target-value or measure-value or any other value that is calculated from these values.

In the adjusting step 438, object measure-value 111-MV is adjusted with expectation-value 121-EV. For example, if expectation-value 121-EV has value type delta percentage and equals −10% and refers to the target-value of object 111, then object-measure value 111-MV is reduced by 10% of the target-value.

In case of multiple risks being assigned to one object and each of the risks results in a corresponding expectation-value, a mathematical operation can be applied to the various risk expectation-values when adjusting the corresponding object measure-value. Examples of the mathematical operation can be: adding, subtracting, dividing, multiplying, averaging, weighted averaging, linear regression or others that may be meaningful for a person skilled in the art.

Turning back to FIG. 8A, in the optional providing step 440, computer 900 provides at least further score-card 110', wherein further score-card 110' is substantially equivalent to score-card 110. Score-card 110' has similar object 111', which is similar to object 111.

In the optional aggregating step 450, object measure-value 111-MV is aggregated into corresponding object measure-value 111-MV' of similar object 111' according to rules of rule-set 190.

What is claimed is:

1. A computer-implemented method for risk evaluation, the method comprising:
   using a system, wherein the system comprises a processor, a computer-readable medium, and distinct software modules embodied on the computer-readable medium, and wherein the distinct software modules when executed cause the processor to perform:
   accessing an object, stored in a memory, wherein the object is a component of a score-card and includes an object risk status and an object measure-value;
   receiving an assignment structure;
   assigning, based on the assignment structure, at least one risk to the object, wherein each risk includes a plurality of threat levels and an expectation value derived from the plurality of threat levels;
   receiving a probability for each threat level within each assigned risk, wherein the probability is associated with a deviation-value of the object measure-value;
   defining a probability distribution matrix based on the plurality of threat levels within each risk, wherein the matrix comprises a row for each threat level and each row includes the threat level, the deviation-value, and the probability, the deviation-value having a value type selected from the group of absolute number, absolute delta, percentage and percentage delta;
   determining the expectation value for each risk based on the probability distribution matrix;
   determining the object measure-value based on the expectation-value of each risk;
   determining the object risk status using pre-defined rules and based on an aggregation of each expectation-value corresponding to each risk assigned to the object;
   storing the object in the memory in response to determining the object risk status; and
   presenting the object-measure value and the object risk status.

2. The method of claim 1, wherein determining the expectation-value step comprises:
   multiplying the deviation-value with the probability in each row of the probability distribution matrix corresponding to the risk; and
   adding the results of the multiplying step.

3. The method of claim 1, wherein the determining the expectation-value step comprises:
   multiplying the deviation-value with the probability in each row of the probability distribution matrix corresponding to the risk; and
   adding the results of the multiplying step.

4. The method of claim 1, comprising:
   providing at least a further score-card, wherein the further score-card is substantially equivalent to the score-card and has a similar object, which is similar to the object of the score-card; and
   aggregating the object measure-value into a corresponding object measure-value of the similar object.

5. The method of claim 1, comprising:
providing at least a further score-card, wherein the further score-card is substantially equivalent to the score-card and has a similar object, which is similar to the object of the score-card; and
aggregating the object measure-value into a corresponding object measure-value of the similar object.

6. The method of claim 2, comprising:
providing at least a further score-card, wherein the further score-card is substantially equivalent to the score-card and has a similar object, which is similar to the object of the score-card; and
aggregating the object measure-value into a corresponding object measure-value of the similar object.

7. The method of claim 3, comprising:
providing at least a further score-card, wherein the further score-card is substantially equivalent to the score-card and has a similar object, which is similar to the object of the score-card; and
aggregating the object measure-value into a corresponding object measure-value of the similar object.

8. A method as in one of claims 1, 2, 3, 4, 5, 6, and 7, wherein the object comprises at least one of strategy, strategy-element, perspective, objective, target and measure.

9. A method as in one of claims 1, 2, 3, 4, 5, 6, and 7, wherein the at least one risk is a component of a risk-catalogue.

10. A computer-readable medium storing computer-readable instructions that, when executed by a computer, cause the computer to perform a method of risk evaluation, the method comprising:
accessing an object, stored in memory, wherein the object is a component of a score-card and includes an object risk status and an object measure-value;
receiving an assignment structure;
assigning, based on the assignment structure, at least one risk to the object, wherein each risk includes a plurality of threat levels and an expectation value derived from the plurality of threat levels;
receiving a probability for each threat level within each assigned risk, wherein the probability is associated with a deviation-value of the object measure-value;
defining a probability distribution matrix based on the plurality of threat levels within each risk, wherein a row is created in the matrix for each threat level and each row includes the threat level, the deviation-value, and the probability, the deviation-value having a value type selected from the group of absolute number, absolute delta, percentage and percentage delta;
determining the expectation value for each risk based on the probability distribution matrix;
determining the object measure-value based on the expectation-value of each risk;
determining the object risk status using pre-defined rules and based on an aggregation of each expectation-value corresponding to each risk assigned to the object;
storing the object in the memory in response to determining the object risk status; and
presenting the object-measure value and the object risk status.

11. The computer-readable medium of claim 10, wherein the instructions for determining the expectation-value comprise:
multiplying the deviation-value with the probability in each row of the probability distribution matrix corresponding to the risk; and
adding the results of the multiplying step.

12. The computer-readable medium of claim 10, comprising instructions for:
providing at least a further score-card, wherein the further score-card is substantially equivalent to the score-card and has a similar object, which is similar to the object of the score-card; and
aggregating the object measure-value into a corresponding object measure-value of the similar object.

13. The computer-readable medium of claim 11, comprising instructions for:
providing at least a further score-card, wherein the further score-card is substantially equivalent to the score-card and has a similar object, which is similar to the object of the score-card; and
aggregating the object measure-value into a corresponding object measure-value of the similar object.

14. A risk evaluation system comprising:
at least one memory for storing an object, a risk at least one risk, and an assignment structure;
at least one processor for executing program instructions for accessing an object, wherein the object is a component of a score-card stored by the at least one memory and includes an object risk status and an object measure-value, and assigning, based on the assignment structure, at least one risk to the object, wherein each risk includes a plurality of threat levels and an expectation value derived from the plurality of threat levels;
a bus for receiving a probability for each threat level within each assigned risk, wherein the probability is associated with a deviation-value of the object measure-value;
the at least one processor for executing program instructions for defining a probability distribution matrix based on the plurality of threat levels within each risk, wherein a row is created in the matrix for each threat level and each row includes the threat level, the deviation-value, and the probability, the deviation-value having a value type selected from the group of absolute number, absolute delta, percentage and percentage delta;
the at least one processor for executing program instructions for determining the expectation value for each risk based on the probability distribution matrix;
the at least one processor for executing program instructions for determining the object measure-value based on the expectation-value of each risk;
the at least one processor for determining the object risk status using pre-defined rules and based on an aggregation of each expectation-value corresponding to each risk assigned to the object; and
the bus for storing the object and presenting the object-measure value and the object risk status.

15. The system of claim 14, wherein the at least one processor for executing program instructions for determining the expectation value executes program instructions for:
multiplying the deviation-value with the probability in each row of the probability distribution matrix corresponding to the risk; and
adding the results of the multiplying step.

16. The system of claim 14, wherein the at least one memory stores at least a further score-card, wherein the further score-card is substantially equivalent to the score-card and has a similar object, which is similar to the object of the score-card; and wherein the at least one processor executes program instructions to aggregate the object measure-value into a corresponding object measure-value of the similar object.

17. The system of claim 15, wherein the at least one memory stores at least a further score-card, wherein the further score-card is substantially equivalent to the score-card and has a similar object, which is similar to the object of the score-card; and wherein the at least one processor executes program instructions to aggregate the object measure-value into a corresponding object measure-value of the similar object.

18. The system of claim 15, wherein the at least one memory stores at least a further score-card, wherein the further score-card is substantially equivalent to the score-card and has a similar object, which is similar to the object of the score-card; and wherein the at least one processor executes program instructions to aggregate the object measure-value into a corresponding object measure-value of the similar object.

19. A system as in one of claims 14, 15, 16, 17 and 18, wherein the at least one risk is a component of a risk-catalogue stored by the at least one memory.

\* \* \* \* \*

UNITED STATES PATENT AND TRADEMARK OFFICE
CERTIFICATE OF CORRECTION

| | | |
|---|---|---|
| PATENT NO. | : 7,599,848 B2 | |
| APPLICATION NO. | : 10/365954 | |
| DATED | : October 6, 2009 | |
| INVENTOR(S) | : Wefers et al. | |

It is certified that error appears in the above-identified patent and that said Letters Patent is hereby corrected as shown below:

On the cover page,

[*] Notice: Subject to any disclaimer, the term of this patent is extended or adjusted under 35 USC 154(b) by 1153 days Delete the phrase "by 1153 days" and insert -- by 1751 days --

Signed and Sealed this

Twentieth Day of April, 2010

David J. Kappos
*Director of the United States Patent and Trademark Office*

UNITED STATES PATENT AND TRADEMARK OFFICE
CERTIFICATE OF CORRECTION

PATENT NO. : 7,599,848 B2　　　　　　　　　　　　　　　　　　　　　　　Page 1 of 1
APPLICATION NO. : 10/365954
DATED : October 6, 2009
INVENTOR(S) : Wefers et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2349 days.

Signed and Sealed this

Twenty-eighth Day of September, 2010

David J. Kappos
*Director of the United States Patent and Trademark Office*